United States Patent [19]
Siebörger et al.

[11] Patent Number: 5,216,555
[45] Date of Patent: Jun. 1, 1993

[54] REPRODUCTION CIRCUIT ARRANGEMENT HAVING A NOISE REDUCTION CIRCUIT AND A GAP DETECTION CIRCUIT

[75] Inventors: Günther Siebörger, Schenefeld; Jörg Wenzel, Hamburg, both of Fed. Rep. of Germany

[73] Assignee: U.S. Philips Corporation, New York, N.Y.

[21] Appl. No.: 741,281

[22] Filed: Aug. 7, 1991

[30] Foreign Application Priority Data

Aug. 14, 1990 [DE] Fed. Rep. of Germany ....... 4025671

[51] Int. Cl.⁵ .............................................. G11B 27/22
[52] U.S. Cl. .................................................. 360/72.1
[58] Field of Search ....................... 369/48, 50, 58, 54; 360/72.1, 74.4

[56] References Cited

U.S. PATENT DOCUMENTS 4,811,128 3/1989 Ono et al. .

*Primary Examiner*—Donald E. McElheny, Jr.
*Attorney, Agent, or Firm*—Edward W. Goodman

[57] ABSTRACT

In a circuit arrangement for reproducing audio information signals recorded in one or a plurality of audio channels on a movable sound carrier, the sound carrier being moved at a normal reproduction speed during reproduction, the arrangement including a noise reduction circuit, each audio channel of the arrangement including an RC network (10, 30) with at least one RC filter, there is provided a gap detection circuit integrated in the reproduction circuit arrangement. This gap detection circuit jointly uses parts of the noise reduction circuit, at least one or a plurality of RC filters of the RC network(s) (10, 30) of the noise reduction circuit, during the time intervals in which gaps in the audio information signals are to be detected by the pause detection circuit when the sound carrier is moved at a higher speed than the normal reproduction speed.

8 Claims, 1 Drawing Sheet

REPRODUCTION CIRCUIT ARRANGEMENT HAVING A NOISE REDUCTION CIRCUIT AND A GAP DETECTION CIRCUIT

BACKGROUND OF THE INVENTION

1. Field of the Invention

The invention relates to a circuit arrangement for reproducing audio information signals recorded in one or a normal plurality of audio channels on a movable sound carrier while the sound carrier is moved with a reproduction speed during reproduction, this arrangement comprising a noise reduction circuit and in this arrangement each audio channel having an RC network that includes at least one RC filter.

2. Description of the Related Art

This type of circuit arrangements for reproducing audio information signals recorded on a sound carrier, which arrangements comprise a noise reduction circuit, have gained ground for use in tape recorders, more specifically, cassette recorders. In this example, the movable sound carrier is understood to be a magnetic tape which is moved past a magnetic head whose output signals are applied to the reproduction circuit arrangement comprising a noise reduction circuit. With such a circuit it may be a matter of noise cancellation according to one of the Dolby systems. In these Dolby systems the treble is lowered on the reproduction side to a greater or lesser extent in dependence on its level, so that, more specifically, the tape noise is reduced simultaneously, Such noise reduction circuits require various filters which have different time constants. Therefore, at least one RC network having one or a plurality of RC filters is provided for each audio channel. A great variety of circuits of this type are known.

In addition, circuits are known which are used for recognizing gaps in the audio information signals when the sound carrier has an increased speed relative to the normal reproduction speed. In the above example of the cassette tape recorder this means that the tape is moved e.g. with a rewinding speed while the magnetic head picks up the audio information signals from the tape in a similar manner that it does with the reproduction speed. In this case, however, not the audio information signals as such are to be evaluated, but there should be detected when gaps occur in the audio information signals. In this manner, for example, individual music titles can be located on the tape. Such gap detection circuits are also known in a great variety of embodiments.

SUMMARY OF THE INVENTION

It is an object of the invention to provide a reproduction circuit arrangement of the type mentioned in the opening paragraph in which a gap detection circuit is integrated with the least possible circuitry and cost.

This object is achieved in accordance with the invention in that the reproduction circuit arrangement comprises a gap detection circuit which jointly uses parts of the noise reduction circuit, at least one or a plurality of RC filters of the RC network(s) of the noise reduction circuit, during the intervals in which the gap detection circuit is to detect gaps in the audio information signals when the sound carrier is moved at a higher speed than the normal production speed.

The gap detection circuit in accordance with the invention thus jointly utilizes several parts of the noise reduction circuit, i.e. these parts need not be additionally present in the gap detection circuit. These elements of the noise reduction circuit which are used in common are, more specifically, one or a plurality of RC filters of the RC network(s) of the noise reduction circuit. Such RC filters are always required in noise reduction circuits and may be used in common by the gap detection circuit because the relevant RC filters in the noise reduction circuit are necessary only during the reproduction of the audio information with the normal reproduction speed, for reducing then the noise int he audio information signals. However, if gaps in the audio information signals are to be detected when the sound carrier moving speed is higher than the normal reproduction speed, these filters may alternatively be used by the gap detection circuit because during that period of time, the noise reduction circuit need not be active and, therefore, these filters may be used by the gap detection circuit. Thus, there is an alternate use of these RC filters or even more components of the noise reduction circuit.

Although the time constants of the RC filters included in the noise reduction circuit are relatively small, these time constants are sufficient for the gap detection circuit to detect the gaps, because the audio information signals are transformed to higher frequencies when the sound carrier is moved at a higher speed than the normal reproduction speed and, consequently, smaller time constants will be sufficient.

The dual use of the RC filters both by the noise reduction circuit and by the gap detection circuit is therefore particularly important because the necessary capacitors are difficult to integrate. The capacitors are to be provided as discrete components and are relatively expensive compared with integrated circuits. Due to the dual use of the RC filters, the number of these discrete components can be reduced.

According to an embodiment of the invention, there is provided that the RC filter(s) is an RC low-pass filter (are RC low-pass filters). In noise reduction circuits of the type mentioned above, the RC filters included in these circuits are already mostly RC low-pass filters, which are pre-eminently suitable for use for gap detection by means of the pause detection circuit.

According to a further embodiment of the invention, there is provided that the gap detection circuit comprises first and second comparators, in that the audio signals are applied for gap detection to a first RC low-pass filter in which they are filtered and which is arranged before the first comparator, in which the filtered audio signals are compared with a first reference voltage and hose output signal is applied to an RC low-pass filter, which is arranged before the second comparator, in which a comparison with a second reference voltage is performed and whose output signal denotes detected gaps.

The audio signals which are picked up by the sound carrier which is moved at a higher speed than the normal reproduction speed are in this form not yet suitable for gap detection. Therefore, they are first applied to a first RC low-pass filter which is already included in an RC network of the noise reduction circuit. These audio signals are filtered in this first RC low-pass filter. The audio signals filtered in this manner are applied to the first comparator in which they are compared with a first reference voltage. This first comparator produces an output signal during the periods of time in which the filtered audio information signals fall short of the reference voltage. The output signal of this comparator thus almost indicates when gaps in the audio information signals appear. Since brief gaps may also appear during music titles, the output signal of this comparator may not yet be used for gap detection. Therefore, it is applied to a second RC low-pass filter which, as does the first low-pass filter, forms part of an RC network of the noise reduction circuit. The time constant of this second RC low-pass filter is selected to be longer than that of the first RC low-pass filter and is selected in such a way that the output signal of the first comparator filtered by the first filter exceeds a second reference voltage in a second comparator only when there is a rather long gap in the audio information signals. The second RC low-pass filter has for its task to filter brief gaps in the audio information signals during music titles and to cause the filtered output voltage of the RC low-pass filter to drop below the second reference voltage during gaps, so that during these times intervals, the second comparator produces an output signal which denotes a detected gap.

In this configuration of the circuit arrangement according to the invention, it becomes evident that two comparators are necessary in the gap detection circuit, but that the additionally required RC low-pass filters may be omitted because these filters are already included in the noise reduction circuit and can jointly be used by the gap detection circuit.

An advantageous further embodiment of the invention provides that a mono audio signal to be processed in the gap detection circuit is formed by adding the audio signals from the two audio channels together and that a low-pass filter of the RC network of one audio channel of the noise reduction circuit is used as a first low-pass filter and a low-pass filter of the RC network of the other audio channel of the noise reduction circuit is used as a second low-pass filter.

If there are two audio channels, thus if stereo audio information signals are concerned, a mono audio signal is formed from the two audio signals by adding them together. This signal is further processed in the gap detection circuit and used for the gap detection. Since a stereo audio signal is concerned, the reproduction circuit arrangement including the noise reduction circuit comprises two audio channels. Thus the noise reduction circuit comprises two RC networks. In this case, it is advantageous to use the first low-pass filter of the RC network of one audio channel and a low-pass filter of the RC network of the second audio channel as the second low-pass filter. Because generally a plurality of low-pass filters are included in the two RC networks, the desired time constant for both low-pass filters can be selected from the available time constants. According to a further embodiment of this circuit arrangement, there is provided that the RC networks of the two audio channels comprise each two RC low-pass filters which have different time constants and that the low-pass filter having the smaller time constant of one audio channel is used as the first low-pass filter and the low-pass filter having the larger time constant of the other audio channel is used as the second low-pass filter.

As observed hereinbefore, the first low-pass filter advantageously has a smaller time constant than the second low-pass filter. Since the RC networks of the two audio channels generally already comprise at least two RC low-pass filters which have different time constants, the low-pass filter having the smaller time constant of the RC network of one channel can be advantageously used as the first low-pass filter and the low-pass filter having the longer time constant of the other audio channel as the second low-pass filter.

This is especially advantageous when further elements of the noise reduction circuit are to be jointly used in the two audio channels. For this purpose, a further embodiment of the invention provides that in the two audio channels of the noise reduction circuit each RC network is preceded by a rectifier which is jointly used by the gap detection circuit. Since RC networks in different audio channels of the noise reduction circuit already comprise the two low-pass filters, the rectifiers can be jointly used without the signals influencing each other.

This accordingly holds for further circuit elements, for example, amplifiers included in the noise reduction circuit. For this purpose, according to an embodiment, there is provided that several amplifiers included in the noise reduction circuit are jointly used by the gap detection circuit.

Especially circuits of the B or C type Dolby version are utilized as noise reduction circuits, Such noise reduction circuits always have for each channel at least two RC low-pass filters which can jointly be used by the gap detection circuit.

BRIEF DESCRIPTION OF THE DRAWING

An exemplary embodiment of the invention will be further explained in the following with reference to the drawing, in which the sole FIGURE shows a block schematic diagram of the invention.

DESCRIPTION OF THE PREFERRED EMBODIMENT

Figure 1:
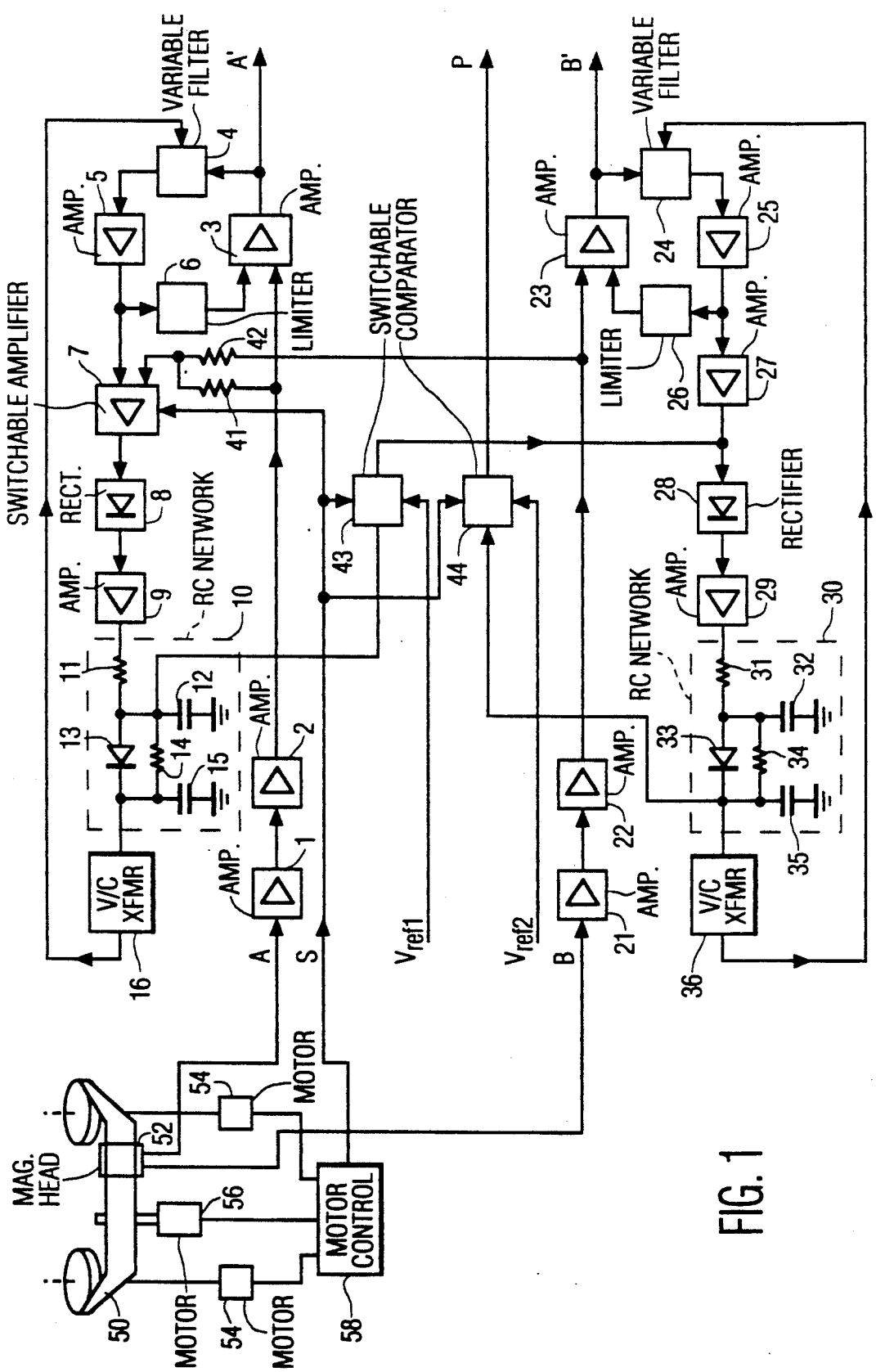

The drawing FIGURE shows an exemplary embodiment of the invention will be further explained in the following with reference to the drawing FIGURE. Thereto the drawing FIGURE shows a reproduction circuit arrangement in a stereo configuration, thus having two audio channels. In the reproduction circuit arrangement a noise reduction circuit of the Dolby B type is integrated. Furthermore, according to the invention, a gap detection circuit is included which jointly uses elements of the noise reduction circuit. The reproduction circuit arrangement shown in the drawing FIGURE is supplied with a stereo audio signal over the audio channels A and B. This stereo signal may come, for example, from a cassette tape 50 from which it was packed up by means of a magnetic head 52, the cassette tape 50 being driven by reel motors 54 and capstan motor 56, the speed and direction of the motors 54 and 56 being controlled by a motor control circuit 58.

The reproduction circuit arrangement shown in the drawing FIGURE has, with respect to the noise reduction circuit, two completely identical audio channels, one of which will be further described below by way of example.

The audio signal of channel A, which originates from the magnetic head 52, is first applied to a head amplifier 1 in which the very weak audio signals coming from the magnetic head are first preamplified. The output signal of this head amplifier 1 reaches a de-emphasis amplifier 2 in which the audio signals are corrected. This is necessary because the audio signals on a tape are usually recorded with a predistortion also termed pre-emphasis. This frequency distortion is again to be eliminated on reproduction. This is mostly referred to as de-emphasis. The thus corrected output signals of the amplifier 2 reach a further amplifier 3 which operates with linear frequency and represents as it were the so-called main path of the noise reduction circuit, which is in fact a Dolby B type circuit.

In addition to the above main path which is formed by the amplifier 3, the noise reduction circuit also includes a secondary path on which the treble signals are lowered in dependence on level and frequency.

In the representation given in the drawing FIGURE, this secondary path is formed by a filter 4 having a variable attenuation characteristic, an amplifier 5 and a limiter 6. The filter 4 having the variable attenuation characteristic is supplied with the output signal of the amplifier 3. The filter 4 is followed by the amplifier 5 whose output signals reach the limiter 6. The output signals of the limiter 6 are applied to a further input of the amplifier 3 and thus again reach the main path of the noise reduction circuit. The output signal of the amplifier 3 represents the output signal A' of this channel of the reproduction circuit arrangement.

The filter 4 has a variable attenuation characteristic which, especially with regard to its operation frequency, is controllable. The control of this operation frequency of the attenuation characteristic is performed by means of a control branch of the noise reduction circuit, of which there is also one available for each channel.

This control branch first comprises an amplifier 7 which has a fixed frequency-dependent characteristic. This amplifier is followed by a rectifier 8 whose output signal passes through a linear amplifier 9. The amplifier 9 is followed by an RC network 10 which comprises two RC low-pass filters. A first RC low-pass filter is constituted by a resistor 11 followed by a founded capacitor 12. The output signal of the first RC low-pass filter can be tapped from the junction between the resistor 11 and the capacitor 12. This junction is connected both to an anode or a diode 13 and to one line of a resistor 14. The other line of this resistor 14 as well as the cathode of the diode 13 are connected by means of a junction to one lead of capacitor 15 whose other lead is connected to ground. The resistor 14 and the capacitor 15 constitute a second RC low-pass filter whose output signal can be tapped from the junction between these two components. It is the function of the diode 13 to short-circuit the resistor 14 and thus disengage the second low-pass filter when the audio signal presents relatively high levels. This function is necessary for the noise reduction circuit of the Dolby B type.

The two RC low-pass filters are followed by a voltage/current transformer 16 whose output signal is used for controlling the variable attenuation characteristic of filter 4. This is effected in a manner for noise reduction circuits of the Dolby B type, after which the treble in the audio signals is lowered in dependence on its level. In addition, the point at which the attenuation characteristic is used in the treble range depends on the level of the audio signal and on the signal frequency. This influencing of the audio signal is effected by the circuit elements 4, 5 and 6 of the secondary branch of the noise reduction circuit. The filter 4 in this secondary branch is again controlled in response to the output signal of the voltage/current transformer 16 of the control branch of the noise reduction circuit.

In addition to the one audio channel of the reproduction circuit arrangement described so far and having an integrated noise reduction circuit, a second audio channel is provided which is structured in identical manner and to which the audio signal B of the second audio channel is applied. The following list shows line-by-line the corresponding components of the two audio channels of the reproduction circuit arrangement:

| Audio channel A | Audio channel B |
| --- | --- |
| amplifier 1 | amplifier 21 |
| de-emphasis amplifier 2 | de-emphasis amplifier 22 |
| amplifier 3 | amplifier 23 |
| filter 4 | filter 24 |
| amplifier 5 | amplifier 25 |
| limiter 6 | limiter 26 |
| amplifier 7 | amplifier 27 |
| rectifier 8 | rectifier 28 |
| amplifier 9 | amplifier 29 |
| RC network 10 | RC network 30 |
| resistor 11 | resistor 31 |
| capacitor 12 | capacitor 32 |
| diode 13 | diode 33 |
| resistor 14 | resistor 34 |
| capacitor 15 | capacitor 35 |
| voltage/current transformer 16 | voltage current transformer 36 |

These elements of the audio channel B of the reproduction circuit arrangement are completely identical with the corresponding elements of the audio channel A with the only exception that the amplifier 27, contrary to the amplifier 7, has only a single input.

In the following, the gap detection circuit integrated in the reproduction circuit arrangement will be further described, which detection circuit jointly uses several circuit elements of the two audio channels of the noise reduction circuit. Especially RC low-pass filters of the two RC networks of the noise reduction circuit are jointly used. Because a reproduction circuit arrangement for stereo audio signals is concerned here, which comprises two audio channels, the RC low-pass filters included in the two RC networks 10 and 30 of the two audio channels are used in such a way that the low-pass filter of the audio channel A is used as the first low-pass filter and the low-pass filter of the audio channel B is used as the second low-pass filter.

The gap detection circuit of the reproduction circuit arrangement represented in the drawing FIGURE first comprises two resistors 41 and 42. These resistors tap the audio signals after the two de-emphasis amplifiers 2 and 22 and add them together. These audio signals summed in this manner reach as mono audio signals a second input of the amplifier 7 included in the control branch of the audio channel A, which amplifier amplifies signals of this input in a linear frequency mode, thus not with the frequency-dependent characteristic. This mono audio signal, amplified by the amplifier 7, reaches the rectifier 8 and after that through the amplifier 9 the RC 10 of the audio channel A. In this network, the signal passes through the first RC low-pass filter which is constituted by the resistor 11 and the capacitor 12. The output signal of this RC low-pass filter reaches a first comparator 43 in which this audio signal is compared with a reference voltage $V_{ref1}$. The result of this comparison is fed as an output signal of the first comparator 43 to the rectifier 28 of the audio channel B of the reproduction circuit arrangement or the noise reduction circuit respectively. After the rectifier 28 has been passed through, the signal reaches, through the amplifier 29, the RC network 30 of the secondary branch of the noise reduction circuit of the audio channel B. In this RC network, the audio signal passes through both RC low-pass filters included in this RC network, the first low-pass filter being constituted by the resistor 31 and the capacitor 32 and the second low-pass filter being constituted by the resistor 34 and the capacitor 35. At the output of the second RC low-pass filter of this audio channel the signal is tapped and fed to a second comparator 44 in which this signal is compared with a second reference voltage $V_{ref2}$. The output signal of this second comparator is referenced P int he drawing FIGURE and denotes the gaps detected in the audio signal.

The two comparators 43 and 44 as well as the amplifier 7 of the control branch of the noise reduction circuit of the audio channel A are switchable by means of a control signal S. With normal sound reproduction for which the sound carrier, in this case the magnetic tape, 50 is moved with the normal reproduction speed under the control of the motors 54 and 56 and motor control circuit 58, thus in the period of time in which a normal sound reproduction is to take place, the switching signal S from the motor control circuit 58 is not active so that the two comparators 43 and 44 are switched off and the amplifier 7 is switched to the input at which it is supplied with the output signal of the amplifier 5 of the secondary branch of the noise reduction circuit of audio channel A. In this case the amplifier 7 works with a frequency-dependent characteristic. The second input of the amplifier 7 to which the mono audio signal of the two audio channels is applied, is blocked in this case. The reproduction circuit arrangement thus operates in a normal fashion. This accordingly holds for the noise reduction circuit which operates without being influenced by the gap detection circuit.

The gap detection circuit is activated by means of the switching signal S only for the periods of time in which the noise reduction circuit must not be active, especially for the periods of time in which the sound carrier is moved with a higher speed than the normal reproduction speed. In these periods of time, a sound reproduction is not necessary or even not desirable. During these periods of time, the gap detection circuit is activated if so desired by means of the signal S. This implies that the amplifier 7 is henceforth switched to its second input which is supplied with the mono audio signal by the two resistors 41 and 42. This mono audio signal is henceforth linearly amplified in the amplifier 7, thus not in response to the frequency-dependent characteristic, rectified in the rectifier 8 and after a further amplification by the amplifier 9 it reaches the RC network 10 of this audio channel of the noise reduction circuit. The signal is again tapped already after the first RC low-pass filter which is constituted by the elements 11 and 12. This RC low-pass filter has a shorter time constant than the second RC low-pass filter constituted by the elements 14 and 15. The shorter time constant of this RC low-pass filter is yet sufficient for filtering first the rectified high-band amplified mono audio signal. This audio signal thus filtered reaches the first comparator 43 and is compared there with the first reference voltage $V_{ref1}$. At this point it is detected when the filtered audio signal drops below a predetermined threshold, thus when there is most probably a gap. This output signal of the first comparator 43 cannot yet be evaluated forthwith because brief gaps occur also during e.g. music signals, which gaps are not gaps between music titles which are intended to be detected. Consequently, the output signal of the comparator 43 is filtered once more. For this purpose, this output signal is first rectified by the rectifier 28 in the control branch of the noise reduction circuit of the audio channel B and, after being amplified by the amplifier 29, applied to the RC network 30 of the audio channel B of the noise reduction circuit. In this RC network 30, this signal passes through the two provided RC low-pass filters; the signal is thus eventually subjected to a low-pass filtering in accordance with the time constant of the second RC filter which is constituted by the elements 34 and 35. In addition, when the capacitor 35 is charged, the diode may become temporarily conductive, so that the capacitor 35 is then charged more rapidly. The output signal of the comparator 43 filtered with the time constant of the second RC low-pass filter of the RC network 30 is applied to the second comparator 44 in which this signal filtered twice is compared with the second reference voltage $V_{ref2}$. The second filtering which is effected with a longer time constant than the first filtering is now especially used for detecting longer gaps in the filtered audio signal. If such a gap occurs, the second comparator 44 will produce an output signal referenced P in the drawing FIGURE. If this output signal occurs, there has been a gap in the audio information signals picked up from the sound carrier.

During the time intervals in which the gap detection circuit is activated by means of the switching signal S, the amplifiers 5 and 25 of the two audio channels can also be activated by this switching signal S in a manner not represented in the drawing FIGURE. This ensures that audio signals do not affect the operation of the pause detection circuit.

In the embodiment of the invention represented in the drawing FIGURE, not only the RC networks 10 and 30 of the noise reduction circuit and the gap detection circuit are jointly used, but also the amplifiers 7, 9, 29 and the rectifiers 8 and 28. Thus for the gap detection circuit, there is a considerable saving on components because the afore-mentioned components of the noise reduction circuit can be jointly used and need not be provided once more the gap detection circuit. The gap detection circuit only needs to comprise the two comparators 43 and 44 in addition to the jointly used circuit elements of the noise reduction circuit.

We claim:

1. A device for reproducing audio signals, said device including a movable sound carrier on which audio information signals are recorded in one or plurality of audio channels, magnetic heads for picking up said audio information signals as said sound carrier is moved therepast, moving means for moving said sound carrier past said magnetic heads, said moving means being capable of moving said sound carrier at a speed corresponding to a normal reproduction speed and at a speed higher than said normal reproduction speed, and a circuit arrangement for processing said audio information signals, said circuit arrangement including an input for receiving said audio information signals, and a noise reduction circuit, coupled to said input, having an RC network including at least one RC filter, characterized in that said circuit arrangement further comprise a gap detection circuit coupled to said input and comprising at least said at least one RC filter in said noise reduction circuit, and switching means for alternatively coupling said at least one RC filter to said noise reduction circuit and for activating said noise reduction circuit, and for alternatively coupling said at least one RC filter to said gap detection circuit and for activating said gap detection circuit, and said moving means is coupled to said switching means, whereby when said moving means is moving said sound carrier at the speed corresponding to said normal reproduction speed, said switching means turns on said noise reduction circuit and couples said at least one RC filter to said noise reduction circuit, and when said moving means is moving said sound carrier at the speed higher than said normal reproduction speed, said switching means turns on said gap detection circuit and couples said at least one RC filter to said gap detection circuit.

2. A device as claimed in claim 7, characterized in that the RC filter in question is a low-pass RC filter.

3. A device as claimed in claim 2, characterized in that the noise reduction circuit includes several amplifiers which are jointly used by the pause detection circuit.

4. A device as claimed in claim 2, characterized in that the noise reduction circuit is a circuit of the Dolby B or C type.

5. A device as claimed in claim 2, wherein said audio information signals include two stereo components, and said circuit arrangement includes two substantially identical channels for processing said two stereo components, said circuit arrangement having said noise reduction circuit in one of said two channels and a further noise reduction circuit, substantially identical to said noise reduction circuit, in the other of said two channels, characterized in that said gap detection circuit comprises first and second comparators, said first comparator being coupled to an output of a first low-pass filter comprising said at least one RC filter for comparing an output signal of said first low-pass filter to a first reference voltage, an output of said first comparator being applied to a second low-pass filter comprising a further RC filter in a further RC network in said further noise reduction circuit, said second comparator being coupled to an output of said second low-pass filter for comparing an output signal of said second low-pass filter with a second reference voltage, whereby an output of said second comparator indicates detected gaps.

6. A device as claimed in claim 5, characterized in that the gap detection circuit means for adding the audio signals from the two channels together forming a mono signal which is applied to said at least one RC filter.

7. A device as claimed in claim 6, characterized in that the RC networks of the noise reduction circuits each comprise two RC low-pass filters having different time constants, wherein the first low-pass filter comprises one of the two RC low-pass filters of said RC network having a smaller time constant of said different time constants, and said second low-pass filter comprises one of the two RC low-pass filters of said further RC network having a larger time constant of said different time constants.

8. A device as claimed in claim 5, characterized in that said noise reduction circuits each further comprise a rectifier arranged before the RC network, each of said rectifiers being jointly used by the gap detection circuit.

* * * * *